US011734416B2

(12) United States Patent
Li

(10) Patent No.: US 11,734,416 B2
(45) Date of Patent: Aug. 22, 2023

(54) CONSTRUCT GENERAL TRUSTED APPLICATION FOR A PLURALITY OF APPLICATIONS

(71) Applicant: Huawei Technologies Co., Ltd., Shenzhen (CN)

(72) Inventor: Zhuofei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 17/047,747

(22) PCT Filed: Apr. 27, 2018

(86) PCT No.: PCT/CN2018/084931
§ 371 (c)(1),
(2) Date: Oct. 15, 2020

(87) PCT Pub. No.: WO2019/205108
PCT Pub. Date: Oct. 31, 2019

(65) Prior Publication Data
US 2021/0165874 A1  Jun. 3, 2021

(51) Int. Cl.
*G06F 21/53* (2013.01)
*G06F 21/44* (2013.01)
(Continued)

(52) U.S. Cl.
CPC ............. *G06F 21/53* (2013.01); *G06F 21/44* (2013.01); *G06F 21/54* (2013.01); *G06F 21/57* (2013.01)

(58) Field of Classification Search
CPC .......... G06F 21/53; G06F 21/44; G06F 21/54; G06F 21/57; H04L 9/08; H04W 12/10
See application file for complete search history.

(56) References Cited

U.S. PATENT DOCUMENTS

2012/0124659 A1* 5/2012 Craft ................. G06Q 20/3567
726/9
2014/0317686 A1* 10/2014 Vetillard ................. G06F 21/74
726/2
(Continued)

FOREIGN PATENT DOCUMENTS

CN  104765612 A   7/2015
CN  104899506 A   9/2015
(Continued)

*Primary Examiner* — Trong H Nguyen
(74) *Attorney, Agent, or Firm* — Conley Rose, P.C.

(57) ABSTRACT

A security application on the terminal uses a client application in a rich execution environment (REE), a general trusted application in a trusted execution environment (TEE), and a secure element (SE) application in a SE. The general trusted application is shared by a plurality of security applications. A method includes receiving, by the general trusted application, a first request from a first client application, determining a corresponding first SE application, sending the first request to the first SE application, sending, by the first SE application, a first command to the general trusted application, executing, by the general trusted application, the first command, returning a first execution result to the first SE application, sending, by the first SE application, a first response to the general trusted application based on the first execution result, and sending, by the general trusted application, the first response to the first client application.

20 Claims, 10 Drawing Sheets

(51) Int. Cl.
*G06F 21/54* (2013.01)
*G06F 21/57* (2013.01)

(56) References Cited

U.S. PATENT DOCUMENTS

| | | |
|---|---|---|
| 2015/0331698 A1 | 11/2015 | Dietze et al. |
| 2015/0358301 A1* | 12/2015 | Dalbehera ............... G06F 21/57 |
| | | 713/171 |
| 2017/0300716 A1* | 10/2017 | Reisgies ............. G06F 21/6209 |
| 2018/0012037 A1* | 1/2018 | Warnez ................. G06F 21/604 |

FOREIGN PATENT DOCUMENTS

| | | |
|---|---|---|
| CN | 104937549 A | 9/2015 |
| CN | 105592019 A | 5/2016 |
| CN | 106228072 A | 12/2016 |
| CN | 106254323 A | 12/2016 |
| CN | 106506472 A | 3/2017 |
| WO | 2014106530 A1 | 7/2014 |

* cited by examiner

CONSTRUCT GENERAL TRUSTED APPLICATION FOR A PLURALITY OF APPLICATIONS

CROSS-REFERENCE TO RELATED APPLICATIONS

This application is a U.S. National Stage of International Patent Application No. PCT/CN2018/084931 filed on Apr. 27, 2018, which is hereby incorporated by reference in its entirety.

TECHNICAL FIELD

This application relates to the field of communications technology, and in particular, to a method for running an application on a terminal and a terminal.

BACKGROUND

Currently, a mobile terminal has three application environments: a rich execution environment (Rich Execution Environment, REE), a trusted execution environment (Trust Execution Environment, TEE), and a secure element (Secure Element, SE).

Generally, when deploying a service with relatively high security (for example, a bank payment service), a service provider (Service Provider, SP) needs to deploy a corresponding application in the three application environments based on security levels of different data in the service. An application in the REE is referred to as a client application (client application, CA), and requires relatively low security. An application in the TEE is a trusted application, referred to as a TA (TEE application), which requires relatively high security. An application in the SE is referred to as a secure element application (applet), and requires highest security in the three types of applications. It should be noted that the TEE has a capability of providing a secure interface and a capability of massive storage. Therefore, the TA is usually a core of service logic, and is used to invoke the capability of the TEE and initiate a command to the applet. The applet only needs to passively respond to the command from the TA.

However, current TEE standardization is relatively low. Therefore, for each service, the SP costs a lot on establishment, development, debugging, maintenance, and the like of each TA. In addition, in a process in which the SP develops and maintains each TA, a security vulnerability is likely introduced. This threatens service security. For example, if the TA does not check an input parameter, data in the TEE may be maliciously copied.

SUMMARY

This application provides a method for running an application on a terminal and a terminal, to improve security of the application on the terminal.

According to a first aspect, the method provided in this application is applied to a terminal including a rich execution environment REE, a trusted execution environment TEE, and a secure element SE. A security application on the terminal uses a client application that corresponds to the security application and that is in the REE, a general trusted application in the TEE, a secure element application that corresponds to the security application and that is in the SE. The general trusted application is shared by at least two security applications. The method specifically includes:

receiving, by the general trusted application, a first request from a first client application, and determining, by the general trusted application based on the first request, a first secure element application corresponding to the first client application; sending, by the general trusted application, the first request to the first secure element application; sending, by the first secure element application, a first command to the general trusted application based on the first request; executing, by the general trusted application, the first command, and returning a first execution result to the first secure element application; sending, by the first secure element application, a first response to the general trusted application based on the first execution result; and sending, by the general trusted application, the first response to the first client application.

The security application is an application having a relatively high security requirement, for example, an SE-type application. The SE-type application may be, for example, a conventional smart card (Smart Card) application such as a bank card, a bus card, or a USB key. The security application may provide a service with higher security for a user based on application environments of the terminal: the REE, the TEE, and the SE.

In this embodiment of this application, one or more CAs (for example, the first client application) in the REE may directly invoke a same TA (for example, the general trusted application) in the TEE, and then the TA (for example, the GTA) interacts with an applet (for example, the first secure element application corresponding to the first client application) corresponding to each CA. In other words, one security application in this embodiment of this application may use the one or more CAs in the REE, one GTA in the TEE, and one or more applets in the SE. The GTA may be shared by a plurality of security applications on the terminal.

Optionally, in a process of interaction between the GTA and each applet, a command may be bidirectionally sent. In other words, the TA may send a command (referred to as a "forward command" in this embodiment of this application) to the applet, and the applet responds to the TA. The applet may also send a command (referred to as a "reverse command" in this embodiment of this application) to the TA, and the TA responds to the applet. In this embodiment of this application, service logic of an application is deployed in the applet. Therefore, the applet needs to send the reverse command to the GTA based on the service logic, and the GTA executes the reverse command.

It should be noted that different applications may have different functions, and further have different service logic (even if a same function may have different service logic). The service logic includes a related service rule, a related service process, and a related parameter that is carried in each step when the terminal implements different functions. For example, in a secure key application, service logic includes: sending a GTA capability list, sending transaction data, displaying the transaction data, obtaining information confirmed by the user, authenticating a user identity, and the like. In this embodiment of this application, the GTA is a TA shared by a plurality of applications, the terminal cannot deploy general service logic in the GTA, and the general service logic is not applicable to CAs of all applications. Therefore, in this embodiment of this application, service logic of each application is deployed in an applet of each application.

For example, in this embodiment of this application, a message sent by the TA to the applet may be in an application protocol data unit (Application Protocol Data Unit, APDU) command format, and a message sent by the applet to the TA may be in a "status word (Status Word, SW)+ response content" format. A format and specific content of the message exchanged between the TA and the applet are not limited in this embodiment of this application.

Therefore, an embodiment of this application provides a method for constructing a general TA (General TA, GTA) in the TEE on the terminal. In other words, different applications may use a same TA, namely, a GTA. The GTA cooperates with each applet to complete a service. In this way, there is no need to develop and maintain a TA for each application. This helps prevent a security vulnerability and improve application security.

The GTA is developed and provided by a TEE OS provider and presents a same interface externally, so that an SP does not need to consider implementation on a TEE side.

In a possible design, the sending, by the first secure element application, a first command to the general trusted application based on the first request is specifically:

sending, by the first secure element application, a second response to the general trusted application based on the first request, where the second response carries the first command.

For example, the applet (namely, the first secure element application) sends a special response (namely, the second response), for example, 0x8FXX, to the GTA (namely, the general trusted application), to indicate that the applet carries a reverse command (namely, the first command) in this message. Then, after receiving the special response, the GTA invokes a resource in the TEE to execute the reverse command that is in the response. After execution, the GTA sends an execution result (namely, the first execution result) to the applet by using an auxiliary command. The auxiliary command may be, for example, a GTA_RETURN, and the execution result is carried in data of the auxiliary command. Returned data may also be carried in the data of the auxiliary command.

In a possible design, the sending, by the first secure element application, a first command to the general trusted application based on the first request is specifically: sending, by the first secure element application, a third response to the general trusted application based on the first request, where the third response indicates that the first secure element application needs to send a command; sending, by the general trusted application, a second request to the first secure element application based on the third response, where the second request is used to request the first secure element application to send the command; and sending, by the first secure element application, a fourth response to the general trusted application based on the second request, where the fourth response carries the first command.

For example, the applet (namely, the first secure element application) sends a special response (namely, the third response) to the GTA (namely, the general trusted application). For example, the response is 0x8EXX, indicating that the applet needs to send the reverse command. After receiving the special response, the GTA sends an auxiliary command (namely, the second request), for example, the GTA_REQUEST, to the applet. The auxiliary command is used to request the applet to send the reverse command. Then, the applet sends a normal response (namely, the fourth response) to the GTA, and adds the reverse command into data of the normal response. After receiving the response, the GTA invokes the resource in the TEE to execute the reverse command that is in the response. After execution, the GTA sends the execution result (namely, the first execution result) to the applet by using the auxiliary command. The auxiliary command may be, for example, the GTA_RE-TURN, and the execution result is carried in data of the auxiliary command. Returned data may further be carried in the data of the auxiliary command. The execution result is an identifier indicating whether the GTA successfully executes the reverse command. The returned data is data that needs to be transferred to the applet after the GTA completes the execution, for example, may include information confirmed by the user, or a personal identification number (personal identification number, PIN) entered by the user.

In a possible design, the determining, by the general trusted application based on the first request, a first secure element application corresponding to the first client application is specifically: determining, by the general trusted application, the first secure element application based on an identifier that is of the first client application and that is carried in the first request and a locally stored correspondence between an identifier of the client application and an identifier of the secure element application.

It should be noted that the GTA stores some general logic, for example, how to select, based on information sent by the CA, an applet corresponding to the CA. For example, the GTA stores a list of CAs that may access the GTA, and a list (for example, a list of a correspondence between an identifier of a CA and an identifier of an applet) of applets that may be accessed by these CAs. In this way, after receiving transaction data from the CA, the GTA may determine, based on the lists, whether the CA may access the GTA and an applet that may be accessed by the CA. The applet that may be accessed by the CA is the selected applet.

In a possible design, before the sending, by the general trusted application, the first request to the first secure element application, the method further includes: sending, by the general trusted application, a capability list to the first secure element application, where the capability list includes a command that is supported to be executed by the general trusted application.

The capability list is used to notify the applet of a capability, of the GTA, of executing a specific reverse command, for example, a mass storage capability, a capability of displaying a QR code, a capability of sending data, and a trusted user interface capability.

In a possible design, the sending, by the first secure element application, a first command to the general trusted application based on the first request includes: sending, by the first secure element application, the first command to the general trusted application based on the first request and the capability list.

For example, the applet determines a subsequent transaction process based on the GTA capability list. For example, for user identity authentication, it is assumed that service logic of the applet is to preferably select fingerprint verification. If the GTA supports the fingerprint verification, the applet first performs the fingerprint verification. If the GTA does not support the fingerprint verification, the applet selects PIN authentication instead of the fingerprint verification.

According to a second aspect, a terminal is provided. An application environment of the terminal includes a rich execution environment REE, a trusted execution environment TEE, and a secure element SE. A security application on the terminal uses a client application that corresponds to the security application and that is in the REE, a general trusted application in the TEE, and a secure element application that corresponds to the security application and that is in the SE. The general trusted application is shared by at least two security applications. The terminal includes a general trusted application unit, a first client application unit, and a first secure element application unit. The general trusted application unit is configured to: receive a first request from the first client application unit; determine, based on the first request, the first secure element application unit corresponding to the first client application unit; and send the first request to the first secure element application unit. The first secure element application unit is configured to send a first command to the general trusted application unit based on the first request. The general trusted application unit is further configured to execute the first command, and return a first execution result to the first secure element application unit. The first secure element application unit is further configured to send a first response to the general trusted application unit based on the first execution result. The general trusted application unit is further configured to send the first response to the first client application unit.

In a possible design, that the first secure element application unit is configured to send the first command to the general trusted application unit based on the first request is specifically: the first secure element application unit is specifically configured to send a second response to the general trusted application unit based on the first request, where the second response carries the first command.

In a possible design, that the first secure element application unit is configured to send the first command to the general trusted application unit based on the first request is specifically: the first secure element application unit is specifically configured to: send a third response to the general trusted application unit based on the first request, where the third response indicates that the first secure element application unit needs to send a command; receive a second request sent by the general trusted application based on the third response, where the second request is used to request the first secure element application unit to send the command; and send a fourth response to the general trusted application unit based on the second request, where the fourth response carries the first command.

In a possible design, that the general trusted application unit is configured to determine, based on the first request, the first secure element application unit corresponding to the first client application unit is specifically: the general trusted application unit is specifically configured to determine the first secure element application unit based on an identifier that is of the first client application unit and that is carried in the first request and a locally stored correspondence between an identifier of the client application and an identifier of the secure element application.

In a possible design, the general trusted application unit is further configured to: send a capability list to the first secure element application unit before the general trusted application unit sends the first request to the first secure element application unit, where the capability list includes a command that is supported to be executed by the general trusted application unit.

In a possible design, that the first secure element application unit is configured to send the first command to the general trusted application unit based on the first request is specifically: the first secure element application unit is specifically configured to send the first command to the general trusted application unit based on the first request and the capability list.

According to a third aspect, a terminal is provided. The terminal includes a processor, a memory, and a touchscreen. The memory and the touchscreen are coupled to the processor, the memory is configured to store computer program code, and the computer program code includes a computer instruction. The processor reads the computer instruction from the memory to perform the method in any possible design method in the first aspect.

According to a fourth aspect, a computer storage medium is provided, and the computer storage medium includes a computer instruction. When the computer instruction is run on a terminal, the terminal is enabled to perform the method in any possible design method in the first aspect.

According to a fifth aspect, a computer program product is provided. When the computer program product runs on a computer, the computer is enabled to perform the method in any possible design method in the first aspect.

DESCRIPTION OF EMBODIMENTS

To describe the technical solutions provided in this application more clearly, several application environments of a terminal in the embodiments of this application are first briefly described.

Figure 1:
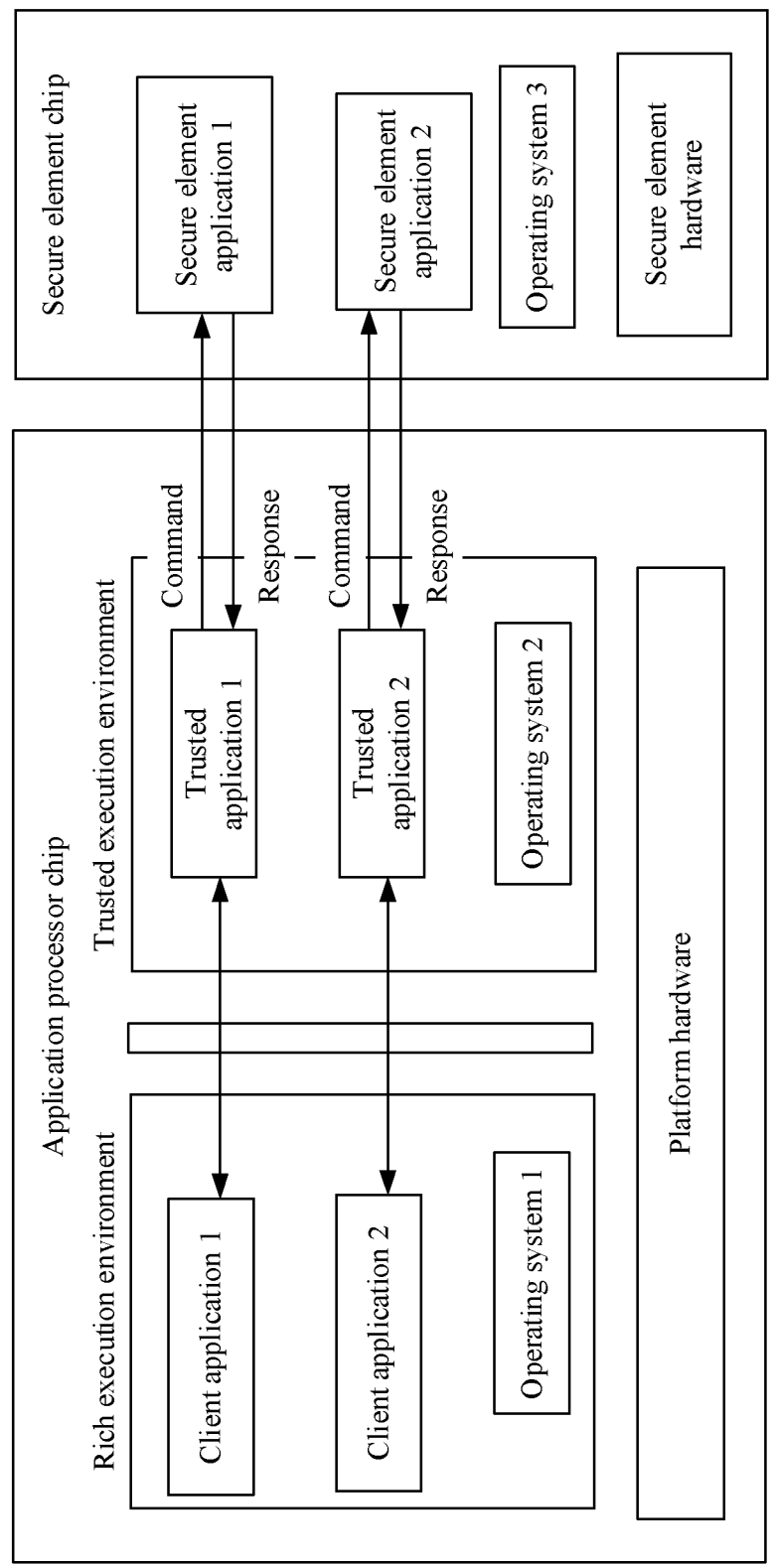
FIG. 1 is a schematic structural diagram of a terminal in the prior art.

FIG. 1 is a schematic diagram of a terminal including a plurality of application environments in the prior art. The terminal includes three application environments: an REE, a TEE, and an SE.

The REE includes a general operating system running on a general-purpose embedded processor, for example, a Rich OS (Rich Operating System) or a kernel, and a CA (FIG. 1 shows a CA 1 and a CA 2) in the general operating system. Although many security measures such as device access control, a device data encryption mechanism, an isolation mechanism during application running, and permission-based access control are used in the REE, security of important data of an application cannot be ensured.

The TEE is a running environment independent of the general operating system. The TEE provides a security service for the general operating system and is isolated from the general operating system. The general operating system and an application program in the general operating system cannot directly access hardware and software resources in the TEE. The TEE provides a trusted running environment for a TA (FIG. 1 shows a TA 1 and a TA 2), and ensures end-to-end security by protecting confidentiality and integrity and by controlling data access permission. The trusted execution environment is parallel to the general operating system of the terminal, and interacts with the general operating system by using a secure application programming interface (Application Programming Interface, API).

The TEE provides a running environment with a security level higher than that of the general operating system, but cannot provide a secure key storage and key running environment with a hardware isolation level. This is because a cryptographic unit in the TEE is still invoked by the REE by using the API. A cryptographic module compiled by using the TEE still works in an invoked slave (slave) mode, and security is relatively low.

The SE is used to construct a trusted and secure key storage and key calculation environment. A software system in the SE is simple, and there are relatively few hardware components. Therefore, it is easy to establish physical protection and implement security assurance to improve security strength of the SE, so that the SE may serve a security system that requires higher security. An application in the SE is referred to as an applet (FIG. 1 shows an applet 1 and an applet 2), and an operating system in the SE is referred to as a COS (Chip Operating System).

It should be noted that a method provided in the embodiments of this application may be applied to an application that requires relatively high security (which may be briefly referred to as a "security application"), for example, an SE-type application. The SE-type application may be, for example, a conventional smart card (Smart Card) application such as a bank card, a bus card, or a USB key. The security application may provide a service with higher security for a user based on the application environments of the terminal: the REE, the TEE, and the SE.

The following briefly describes, by using a secure key application as an example, a process in which the application that requires relatively high security is deployed on the terminal.

During production of a mobile phone, the TEE and the SE are integrated into the mobile phone. Usually, security domain initialization of the TEE and the SE is also completed during the production of the mobile phone.

During initial use of the mobile phone, the TA may be installed in the TEE in a form of, for example, an application installation package. For example, the mobile phone downloads and installs the applet in the SE from a trusted service manager (Trusted Service Management, TSM) over the air. The mobile phone also needs to generate and download a user security certificate. When user identity authentication is transferred, a pair of a public key and a private key are generated. It is permanently ensured that the private key cannot be read from the SE. The public key is sent to an identity authentication center (CA) for signing a user certificate, and the user certificate is downloaded to the SE, to complete binding between the terminal and a user identity.

When the mobile phone is subsequently used, for example, when the user initiates a transaction request such as transfer, the CA in the REE on the mobile phone is switched to the TA in the TEE, and the user may enter a password on a trusted screen of the TA. The TA helps prevent a malicious program from monitoring and stealing information entered by the user. Then, transaction information of the user can also be securely displayed on the trusted screen, to be confirmed by the user. The TA also helps prevent the malicious program from tampering with the transaction information. After the user performs confirmation and authentication, the TA forwards the transaction information to the applet in the SE. The applet authenticates a password entered by the user, signs transaction data after authentication succeeds, and sends signed transaction data to the TA and the CA. The CA returns the signed transaction data to a service provider for background transaction authentication. After the authentication succeeds, a transaction is completed.

It should be noted that, currently, in a process of interaction between the TA and the applet, service logic of a secure key is the TA deployed in the TEE. The TA unidirectionally sends a command to the applet in the SE. Then, after receiving the command, the applet responds to the SE. It can be learned that the SP needs to develop different TAs in the TEE for different applications. However, in a process in which the SP develops and maintains the different TAs, a security vulnerability is likely introduced. This threatens application security. In addition, TAs in different TEE OSs are incompatible with each other, and the SP needs to develop TAs of different versions for the different TEE OSs. This is inconvenient for the SP to rapidly and widely deploy the application.

Therefore, an embodiment of this application provides a method for constructing a general TA (General TA, GTA) in a TEE on a terminal. In this embodiment of this application, different applications of different SPs may use a same TA, namely, the GTA. The GTA cooperates with each applet to complete a service. In this way, there is no need to develop and maintain a TA for each application. This helps prevent the security vulnerability and improve the application security. The GTA is developed and provided by a TEE OS provider and presents a same interface externally, so that the SP does not need to consider implementation on a TEE side.

For example, the terminal in this application may be a mobile phone (for example, a mobile phone 100 shown in FIG. 2), a tablet computer, a personal computer (Personal Computer, PC), a personal digital assistant (personal digital assistant, PDA) a smartwatch, a netbook, a wearable electronic device, an augmented reality (Augmented Reality, AR) technology device, a virtual reality (Virtual Reality, VR) device, and the like on which an application program may be installed and an application program icon may be displayed. A specific form of the terminal is not specially limited in this application.

Figure 2:
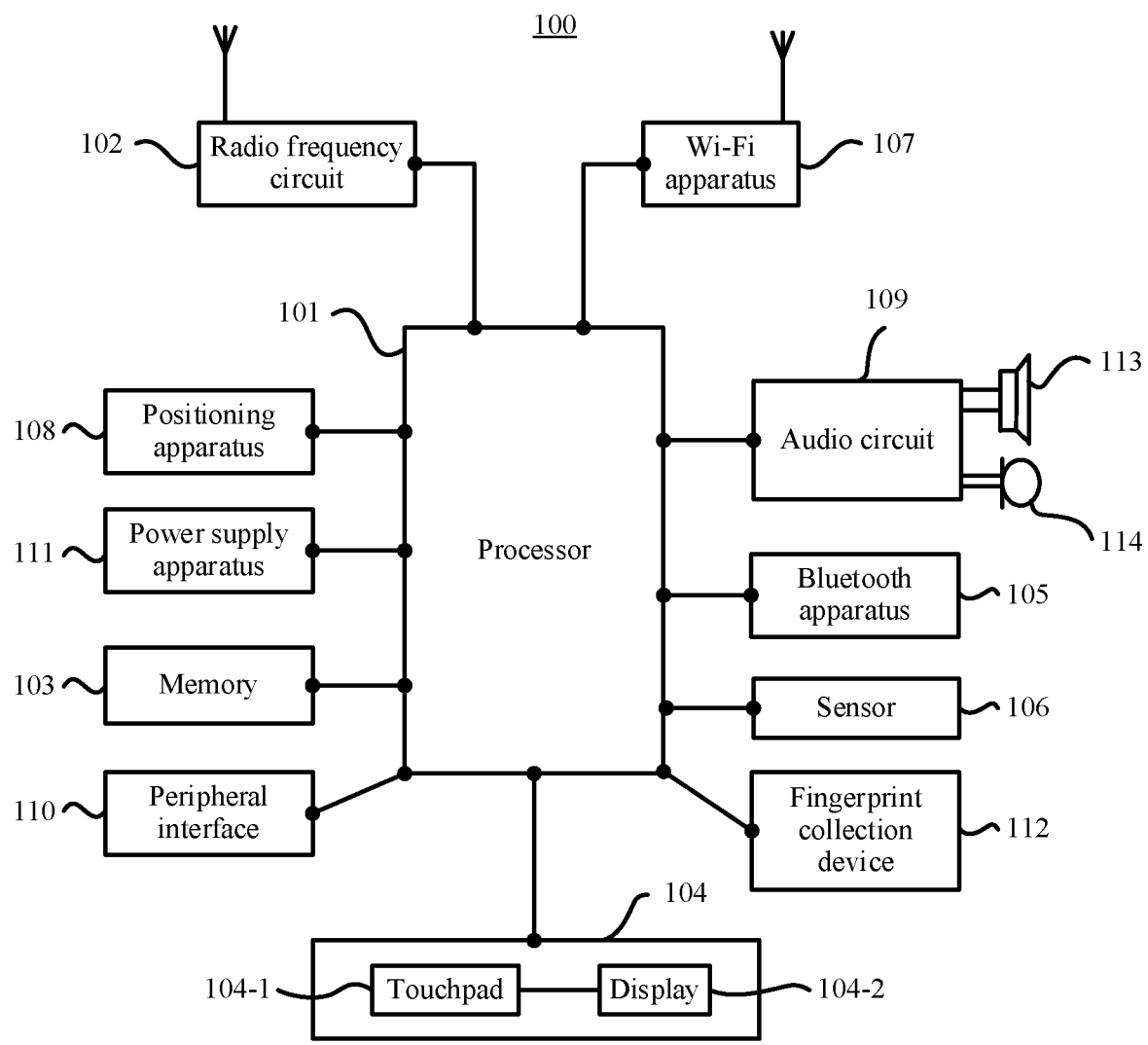
FIG. 2 is a schematic structural diagram 1 of a terminal according to an embodiment of this application.

As shown in FIG. 2, that the mobile phone 100 is the terminal is used as an example. The mobile phone 100 may specifically include components such as a processor 101, a radio frequency (Radio Frequency, RF) circuit 102, a memory 103, a touchscreen 104, a Bluetooth apparatus 105, one or more sensors 106, a wireless fidelity (Wireless Fidelity, Wi-Fi) apparatus 107, a positioning apparatus 108, an audio circuit 109, a peripheral interface 110, and a power supply apparatus 111. These components may perform communication by using one or more communications buses or signal cables (not shown in FIG. 2). A person skilled in the art may understand that a hardware structure shown in FIG. 2 does not constitute any limitation on the mobile phone, and the mobile phone 100 may include more or fewer components than those shown in the figure, or may combine some components, or may have different component arrangements.

The following describes the components of the mobile phone 100 in detail with reference to FIG. 2.

The processor 101 is a control center of the mobile phone 100. The processor 101 is connected to all parts of the mobile phone 100 by using various interfaces and lines, and performs various functions of the mobile phone 100 and data processing by running or executing an application program stored in the memory 103 and invoking data stored in the memory 103. In some embodiments, the processor 101 may include one or more processing units. For example, the processor 101 may be a chip Kirin 960 manufactured by Huawei Technologies Co., Ltd.

In some examples of this embodiment of this application, the processor 101 includes three independent units in hardware, which are specifically a baseband processing unit, an application processing unit, and a security unit. The baseband processing unit may be, for example, a baseband processor (Baseband Processor, BP); the application processing unit may be, for example, an application processor (Application Processor); and the security unit may be, for example, a secure element (Secure Element, SE).

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 103 is configured to store the application program and the data. The processor 101 performs the various functions of the mobile phone 100 and the data processing by running the application program and the data that are stored in the memory 103. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (Random Access Memory, RAM), and may further include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent, and is connected to the processor 101 by using the communications bus; or the memory 103 may be integrated into the processor 101.

The touchscreen 104 may specifically include a touchpad 104-1 and a display 104-2.

The touchpad 104-1 may collect a touch event (for example, an operation performed by a user on the touchpad 104-1 or near the touchpad 104-1 by using any proper object such as a finger or a stylus) performed by the user of the mobile phone 100 on or near the touchpad 104-1, and send collected touch information to another component (for example, the processor 101). The touch event performed by the user near the touchpad 104-1 may be referred to as a floating touch. The floating touch may mean that the user does not need to directly touch the touchpad to select, move, or drag an object (for example, an icon), and the user only needs to be near a device to execute an expected function. In addition, the touchpad 104-1 may be implemented in a plurality of types such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form of a liquid crystal display, an organic light emitting diode, or the like. The touchpad 104-1 may cover the display 104-2. After detecting the touch event on or near the touchpad 104-1, the touchpad 104-1 transfers the touch event to the processor 101 to determine a type of the touch event. Then, the processor 101 may provide corresponding visual output on the display 104-2 based on the type of the touch event. Although in FIG. 2, the touchpad 104-1 and the display screen 104-2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking a plurality of layers of materials. In this embodiment of this application, only the touchpad (layer) and the display screen (layer) are displayed, and another layer is not recorded in this embodiment of this application. In addition, the touchpad 104-1 may be disposed on a front side of the mobile phone 100 in a full panel form, and the display 104-2 may also be disposed on the front side of the mobile phone 100 in a full panel form. In this way, a bezel-less structure can be implemented on the front side of the mobile phone.

In addition, the mobile phone 100 may further have a fingerprint recognition function. For example, a fingerprint sensor 112 may be disposed on a back side of the mobile phone 100 (for example, at a lower part of a rear-facing camera), or the fingerprint sensor 112 may be disposed on the front side of the mobile phone 100 (for example, at a lower part of the touchscreen 104). For another example, the fingerprint collection component 112 may be disposed on the touchscreen 104 to implement the fingerprint recognition function. In other words, the fingerprint collection component 112 may be integrated into the touchscreen 104 to implement the fingerprint recognition function of the mobile phone 100. In this case, the fingerprint collection device 112 is configured on the touchscreen 104, and may be a part of the touchscreen 104, or may be configured on the touchscreen 104 in another manner. A main component of the fingerprint collection component 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, or the like.

The mobile phone 100 may further include the Bluetooth apparatus 105, configured to implement data exchange between the mobile phone 100 and another short-distance device (for example, a mobile phone or a smartwatch). In this embodiment of this application, the Bluetooth apparatus may be an integrated circuit, a Bluetooth chip, or the like.

The mobile phone 100 may further include at least one type of sensor 106, such as a light sensor, a motion sensor, or another sensor. Specifically, the light sensor may include an ambient light sensor and a proximity sensor. The ambient light sensor may adjust luminance of the display of the touchscreen 104 based on luminance of ambient light, and the proximity sensor may power off the display when the mobile phone 100 approaches an ear. As a type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape mode and a portrait mode, a related game, or magnetometer posture calibration), a function related to vibration recognition (such as a pedometer or a knock), and the like. For another sensor that may be further configured on the mobile phone 100, such as a gyroscope, a barometer, a hygrometer, a thermometer, or an infrared sensor, details are not described herein again.

The Wi-Fi apparatus 107 is configured to provide the mobile phone 100 with network access that complies with a Wi-Fi-related standard protocol. The mobile phone 100 may access a Wi-Fi access point by using the Wi-Fi apparatus 107, to help the user to receive and send an email, browse a web page, access streaming media, and the like. The Wi-Fi apparatus 107 provides wireless broadband internet access for the user. In some other embodiments, the Wi-Fi apparatus 107 may also be used as a Wi-Fi wireless access point, and may provide Wi-Fi network access for another device.

The positioning apparatus 108 is configured to provide a geographical location for the mobile phone 100. It may be understood that the positioning apparatus 108 may be specifically a receiver of a positioning system such as a global positioning system (Global Positioning System, GPS), a BeiDou navigation satellite system, or a Russian GLONASS. After receiving the geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (Assisted Global Positioning System, AGPS). The AGPS system serves as an assisted server to assist the positioning apparatus 108 in completing ranging and positioning services. In this case, the assisted positioning server communicates with a device such as the positioning apparatus 108 (namely, a GPS receiver) of the mobile phone 100 through a wireless communications network, to provide positioning assistance. In some other embodiments, the positioning apparatus 108 may be a positioning technology based on the Wi-Fi access point. Each Wi-Fi access point has a globally unique media access control (Media Access Control, MAC) address, and the device may scan and collect a broadcast signal of a nearby Wi-Fi access point when the device enables Wi-Fi. Therefore, a MAC address broadcast by the Wi-Fi access point may be obtained. The device sends such data (for example, the MAC address) that can identify the Wi-Fi access point to a location server through the wireless communications network. The location server retrieves a geographic location of each Wi-Fi access point, calculates a geographic location of the device with reference to strength of a Wi-Fi broadcast signal, and sends the geographic location of the device to the positioning apparatus 108 of the device.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into a sound signal for output. In addition, the microphone 114 converts a collected sound signal into an electrical signal. The audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the peripheral interface 110 is connected to the mouse by using a universal serial bus (Universal Serial Bus, USB) interface, and is connected, by using a metal contact on a card slot of the subscriber identification module card, to the subscriber identification module (Subscriber Identification Module, SIM) card provided by a telecommunications operator. The peripheral interface 110 may be configured to couple the external input/output peripheral device to the processor 101 and the memory 103.

The mobile phone 100 may further include the power supply apparatus 111 (for example, a battery and a power management chip) that supplies power to the components. The battery may be logically connected to the processor 101 by using the power management chip, so that functions such as charging management, discharging management, and power consumption management are implemented by using the power supply apparatus 111.

Although not shown in FIG. 2, the mobile phone 100 may further include a camera (a front-facing camera and/or the rear-facing camera), a camera flash, a micro projection apparatus, a near field communication (Near Field Communication, NFC) apparatus, and the like. Details are not described herein again.

All methods in the following embodiments may be implemented in the mobile phone 100 having the foregoing hardware structure.

Figure 3:
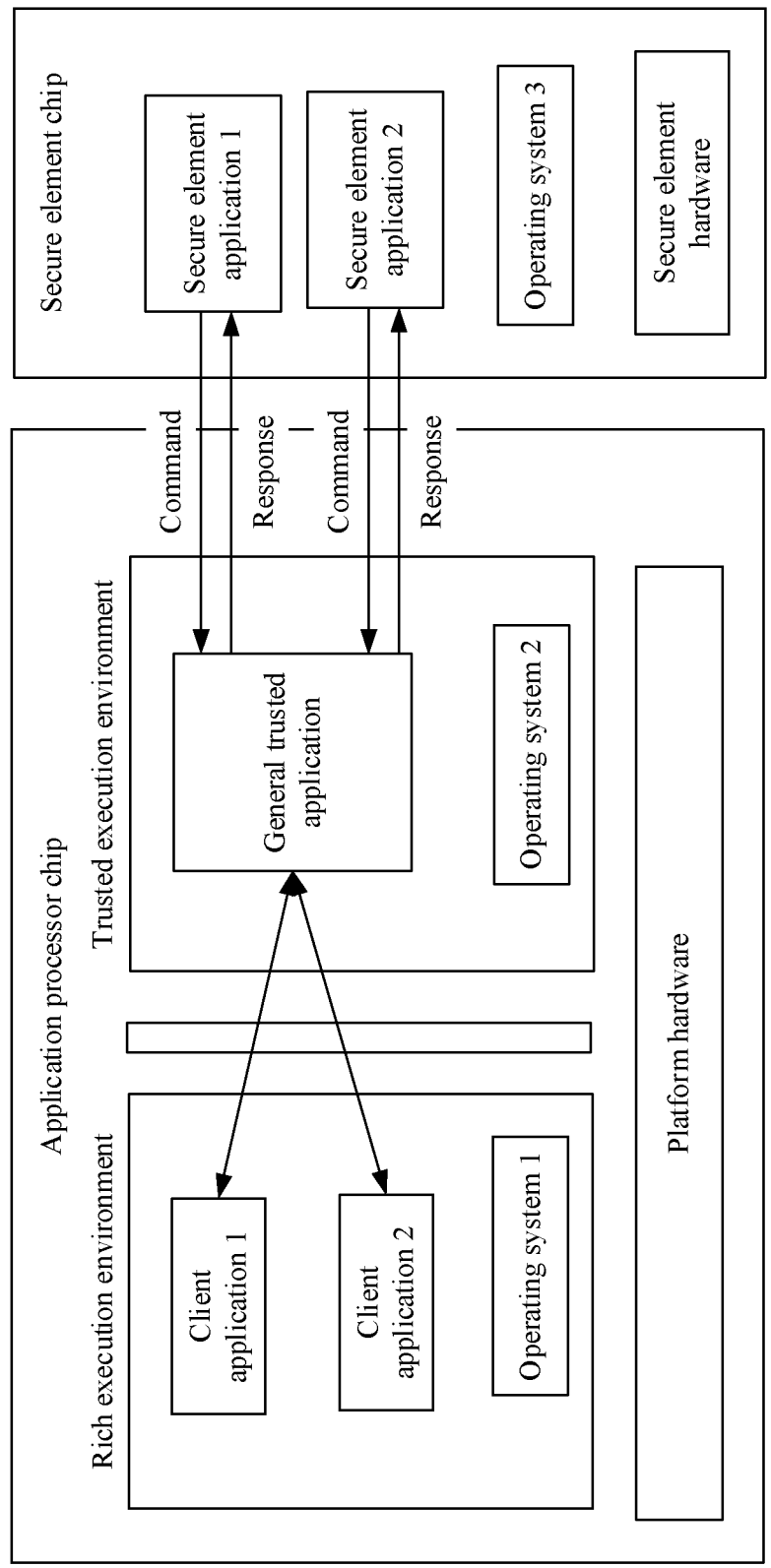
FIG. 3 is a schematic structural diagram 2 of a terminal according to an embodiment of this application.

FIG. 3 is a schematic diagram of a terminal including a plurality of application environments according to an embodiment of this application. The terminal includes three application environments: an REE, a TEE, and an SE. One or more CAs in the REE may directly invoke a same TA (for example, a GTA) in the TEE, and then the TA (for example, the GTA) interacts with an applet corresponding to each CA.

In other words, one security application in this embodiment of this application may use the one or more CAs in the REE, one GTA in the TEE, and one or more applets in the SE. The GTA may be shared by a plurality of security applications on the terminal.

Optionally, in a process of interaction between the GTA and each applet, a command may be sent bidirectionally. In other words, the TA may send a command (referred to as a "forward command" in this embodiment of this application) to the applet, and the applet responds to the TA. The applet may also send a command (referred to as a "reverse command" in this embodiment of this application) to the TA, and the TA responds to the applet. In this embodiment of this application, service logic of an application is deployed in the applet. Therefore, the applet needs to send the reverse command to the GTA based on the service logic, and the GTA executes the reverse command. For a specific implementation process, refer to the following description.

It should be noted that different applications may have different functions, and further have different service logic (even if a same function may have different service logic). The service logic includes a related service rule, a related service process, and a related parameter that is carried in each step when the terminal implements different functions.

For example, in a secure key application, service logic includes: sending a GTA capability list, sending transaction data, displaying the transaction data, obtaining information confirmed by a user, authenticating a user identity, and the like. In this embodiment of this application, the GTA is a TA shared by a plurality of applications, the terminal cannot deploy general service logic in the GTA, and the general service logic is not applicable to CAs of all applications. Therefore, in this embodiment of this application, service logic of each application is deployed in an applet of each application.

For example, in this embodiment of this application, a message sent by the TA to the applet may be in an application protocol data unit (Application Protocol Data Unit, APDU) command format, and a message sent by the applet to the TA may be in a "status word (Status Word, SW)+response content" format. A format and specific content of the message exchanged between the TA and the applet are not limited in this embodiment of this application.

For example, a process of interaction between the TA and the applet is described by using an example in which the message exchanged between the TA and the applet uses the APDU command format and the "SW+response content" format, and the TA is the GTA.

For a general GTA used in this embodiment of this application, a command sent by the GTA to the applet and a command sent by the CA to the GTA that are provided in this embodiment of this application are collectively referred to as an "auxiliary command" herein. To distinguish from a response (referred to as a "normal response" in this embodiment of this application) sent by the applet to the TA in the prior art, a newly added response sent by the applet to the GTA in this embodiment of this application is referred to as a "special response" herein. The "special response" is used to carry the reverse command sent by the applet to the GTA or notify the GTA that the applet needs to send the reverse command.

The following uses examples to separately describe newly added messages (the auxiliary command, the special response, and the reverse command) in this embodiment of this application.

1. Auxiliary Command

In this embodiment of this application, the auxiliary command includes a message sent by the CA to the GTA and a message sent by the GTA to the applet. The message sent by the GTA to the applet may be in a form of the APDU command format, and is actually a GTA capability sent by the GTA to the applet, required transaction data, or a response for a reverse command.

Specifically, it can be learned from a main international specification GP (Global Platform) in a/an TEE/SE field that a command line including an APDU sent by the TA to the applet is CLS INS P1 P2 Lc DATA Le. CLS indicates an instruction type, INS indicates instruction code, P1 and P2 are parameters, Lc is a length of Data, Le indicates an expected responded data byte, and a value 0 indicates a maximum possible length.

In this embodiment of this application, values of CLS and INS may be customized to distinguish from different auxiliary commands, and a related parameter in the auxiliary command may be carried in P1 and P2.

Several examples of different auxiliary commands are listed in the following.

Table 1 shows some examples of an auxiliary command sent by the CA to the GTA. Specific use of each command is described in detail in the following with reference to a specific service. Details are not described herein again.

TABLE 1

Example of an auxiliary command sent by a CA to a GTA

| Number | Name | Note |
|---|---|---|
| 0x01 | CA_SEND_DATA | Send transaction data to the GTA |
| 0x02 | CA_MANAGE_RESOURCE | Manage a resource in the GTA, including adding, replacing, and deleting the resource |

Table 2 shows some examples of an auxiliary command sent by the GTA to the applet. Specific use of each command is described in detail in the following with reference to a specific service. Details are not described herein again.

TABLE 2

Example of an auxiliary command sent by a GTA to an applet

| Number | Name | Note |
|---|---|---|
| 0x01 | GTA_SEND_ABILITY | Send a GTA capability list to the applet, to indicate a reverse command supported by the GTA |
| 0x02 | GTA_SEND_DATA | Send transaction data to the applet, where there may be a plurality of pieces of transaction data, and the last piece of transaction data is identified by P2 = 0x80 |
| 0x03 | GTA_REQUEST | Send the reverse command to the applet |
| 0x04 | GTA_RETURN | Return, to the applet, a result of executing the reverse command by the GTA |

2. Special Response

In this embodiment of this application, the special response is a response sent by the applet to the GTA, and the special response uses the "SW+response content" format. In fact, the special response may notify the GTA that the applet needs to send a reverse command. Alternatively, the special response may directly carry, in response content, a command (the reverse command) sent by the applet to the GTA.

An SW in the "SW+response content" format includes but is not limited to several types shown in Table 3. Specific use of each SW is described in detail in the following with reference to a specific service. Details are not described herein again.

TABLE 3

Example of an SW

| SW | Note |
|---|---|
| 0x8FXX | An applet ends processing of this command normally, and the applet sends a reverse command with a length of XX in response to the command |
| 0x8EXX | The applet ends the processing of the command normally, and the applet expects to send the reverse command with the length of XX; and then a GTA should send a GTA_REQUEST to obtain the reverse command |

It should be noted that an SW value of a normal response is 0x9000, indicating that processing of a received command is completed normally.

3. Reverse Command

In this embodiment of this application, the command (the reverse command) sent by the applet to the GTA may be carried in response content in a special response (for example, an SW value is "0x8FXX") and/or a normal response (an SW value is "0x9000"). The two responses carrying the reverse command may be applied to different communication mechanisms. Specifically, refer to descriptions of a communication mechanism of the GTA and that of the applet in FIG. 4.

Table 4 shows some examples of several reverse commands provided in this embodiment of this application. Specific use of each reverse command is described in detail in the following with reference to a specific service. Details are not described herein again.

TABLE 4

Some examples of a reverse command

| Number | Name | Note |
| --- | --- | --- |
| 0x01 | SE_SHOW_TEXT | Display text information by using a trusted user interface (Trusted User Interface, TUI) |
| 0x02 | SE_GET_INPUT | Receive user input by using the TUI |
| 0x03 | SE_VERIFY_FP | Authenticate a user fingerprint in a trusted manner by using a fingerprint service |
| 0x04 | SE_SHOW_QRCODE | Display a QR code in the trusted manner by using a QR code service and the TUI |
| 0x05 | SE_SCAN_QRCODE | Scan the QR code in the trusted manner by using the QR code service |
| 0x06 | SE_GET_GESTURE | Obtain gesture data in the trusted manner by using a gesture service |
| 0x07 | SE_STORE_DATA | Store the data in a TEE through trusted storage |
| 0x08 | SE_HANDLE_CLOCK | Start or stop timing by using a trusted clock |
| 0x09 | SE_RETURN_DATA | Send the data back to a GTA invoker by using a GTA |
| 0x0A | SE_VERIFY_IRIS | Perform iris recognition authentication on a user by using an iris recognition service |
| 0x0B | SE_VERIFY_FACE | Perform facial recognition authentication on the user by using a facial recognition service |

Figure 4:
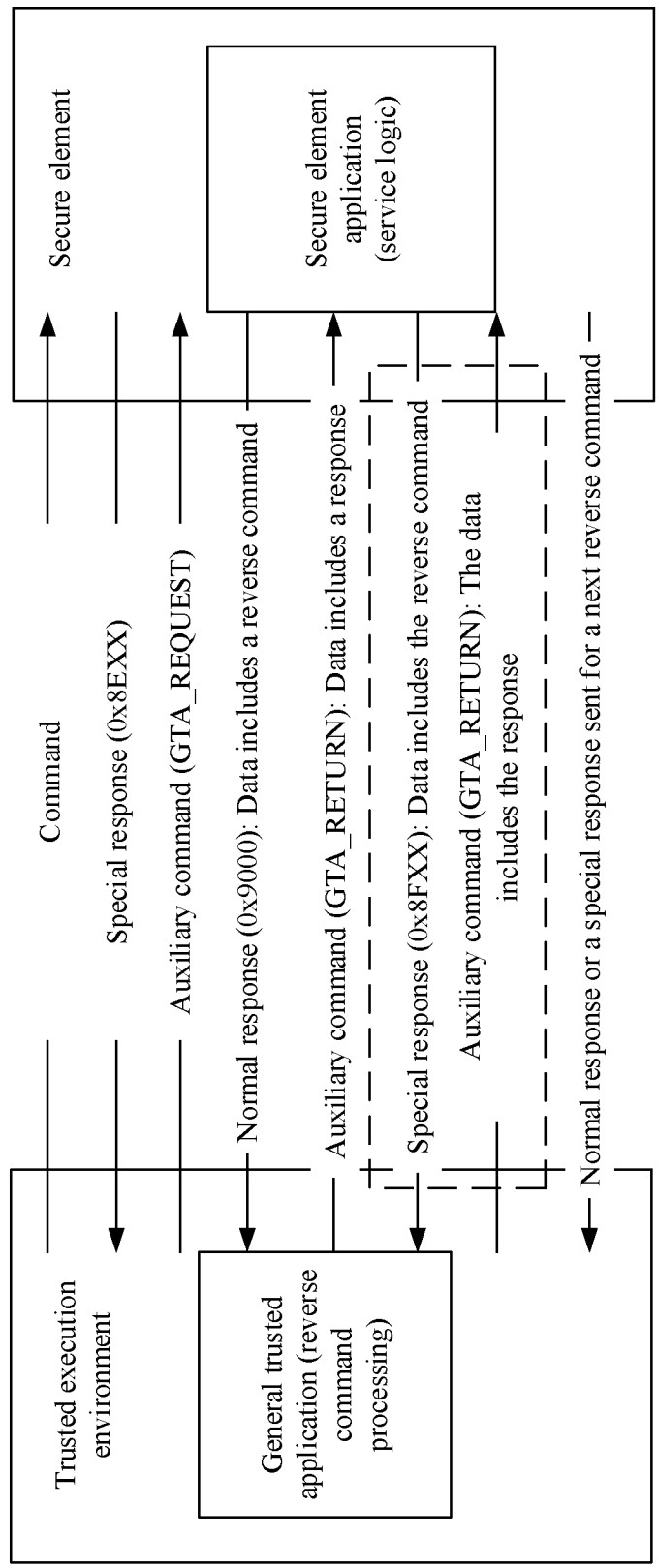
FIG. 4 is a schematic flowchart 1 of a method for running an application according to an embodiment of this application.

As shown in FIG. 4, with reference to the examples of the auxiliary command, the special response, and the reverse command provided in the tables, the communication mechanism of the GTA and that of the applet provided in this embodiment of this application are described as examples. Details are as follows.

In one communication mechanism, interaction between the GTA and the applet is as follows.

The GTA sends an auxiliary command, for example, the GTA_SEND_ABILITY or the GTA_SEND_DATA, to the applet.

After receiving the auxiliary command sent by the GTA, the applet determines a subsequent service process based on service logic and a GTA capability.

For example, the applet sends a special response to the GTA. For example, the response is 0x8EXX, indicating that the applet needs to send a reverse command. After receiving the special response, the GTA sends the auxiliary command, for example, the GTA_REQUEST, to the applet. The auxiliary command is used to request the applet to send the reverse command. Then, the applet sends a normal response (0x9000) to the GTA, and adds the reverse command into data of the normal response. After receiving the response, the GTA invokes a resource in the TEE to execute the reverse command that is in the response. After the reverse command is executed, the GTA sends an execution result to the applet by using the auxiliary command. The auxiliary command may be, for example, the GTA_RETURN, and the execution result is carried in data of the auxiliary command. Returned data may further be carried in the data of the auxiliary command. The execution result is an identifier indicating whether the GTA successfully executes the reverse command. The returned data is data that needs to be transferred to the applet after the GTA completes execution, for example, may include information confirmed by the user, or a personal identification number (personal identification number, PIN) entered by the user.

Then, the applet sends a normal response to the GTA, indicating that execution of a previous command is completed. Alternatively, the applet sends a special response indicating that the applet needs to send a next reverse command.

In the other communication mechanism, interaction between the GTA and the applet is as follows.

The GTA sends an auxiliary command, for example, the GTA_SEND_ABILITY or the GTA_SEND_DATA, to the applet.

After receiving the auxiliary command sent by the GTA, the applet determines a subsequent service process based on service logic and a GTA capability.

For example, the applet sends a special response, for example, 08FXX0x8FXX, to the GTA, to indicate that the applet adds a reverse command into this message. Then, after receiving the special response, the GTA invokes the resource in the TEE to execute the reverse command that is in the response. After the reverse command is executed, the GTA sends an execution result to the applet by using the auxiliary command. The auxiliary command may be, for example, the GTA_RETURN, and the execution result is carried in data of the auxiliary command. Returned data may also be carried in the data of the auxiliary command.

Then, the applet sends a normal response to the GTA, indicating that execution of a previous command is completed. Alternatively, the applet sends a special response indicating that the applet needs to send a next reverse command.

In short, in the first communication mechanism, the applet notifies, by using the special response such as "0x8EXX", the GTA that there is the reverse command to be sent, and then adds the specific reverse command into response content of the normal response (an SW value is "0x9000"). In the second communication mechanism, the applet directly adds the specific reverse command into response content of the special response such as "0x8FXX".

It should be noted that this embodiment of this application provides two implementations of sending the reverse command between the GTA and the applet. In an application on the terminal, any one of the implementations may be used, or a combination of the two implementations may be used. This is not limited in this embodiment of this application.

The following describes the communication mechanism by using an example with reference to a specific application.

Figure 5:
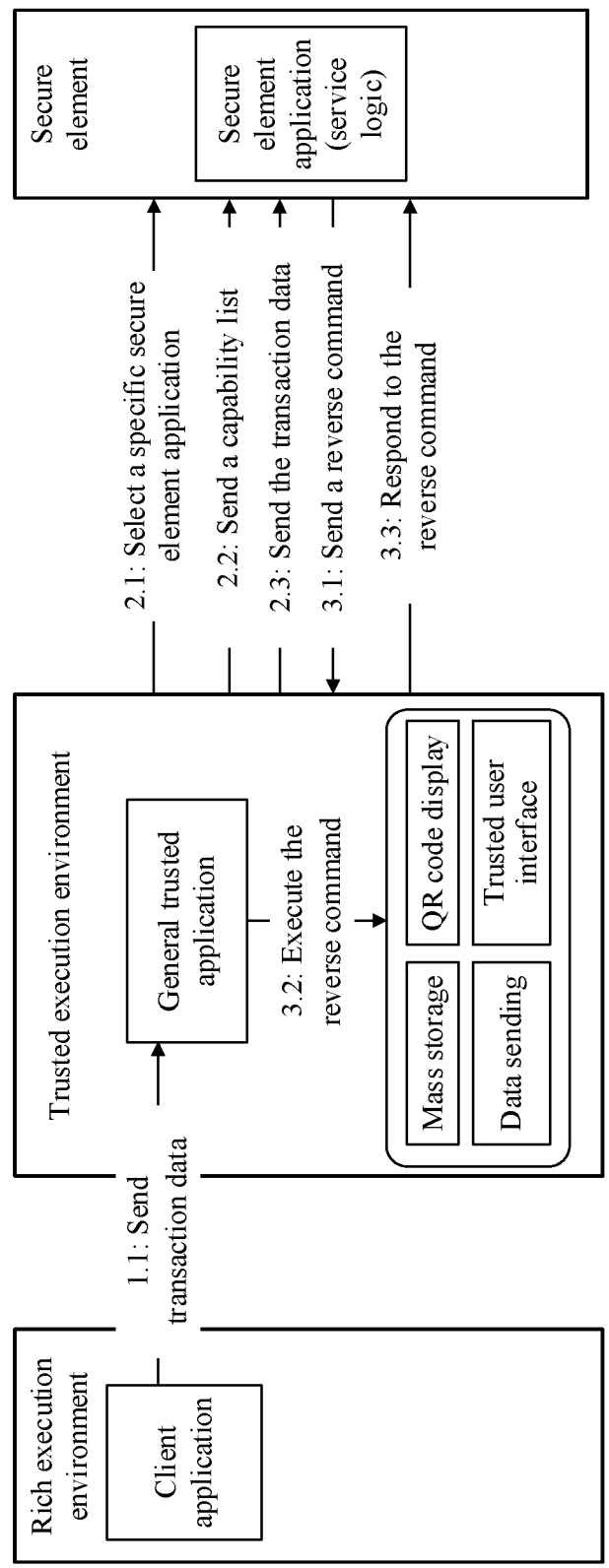
FIG. 5 is a schematic flowchart 2 of a method for running an application according to an embodiment of this application.

FIG. 5 is a schematic diagram of a transaction process of an application according to an embodiment of this application. Generally, there are three processes: 1. A CA sends transaction data to a GTA. 2. The GTA sends the transaction data to an applet. 3. The applet sends a reverse command to the GTA and the GTA executes the reverse command. All processes are as follows.

1.1: The CA sends the transaction data to the GTA.

Specifically, when an application that is of an SP and that is on a terminal initiates a transaction event by using a CA of the SP, the CA sends, according to an agreement (for example, transaction content that needs to be sent and a format used for sending) with the applet in advance, transaction content related to the transaction event to the GTA in a corresponding format. The transaction data is related to the transaction event. For example, for a bank transfer service, the transaction data includes transfer account information, payee information, an amount, and the like.

It should be noted that before sending the transaction data to the GTA, the CA needs to obtain, in advance based on access control logic of the CA and a TA (including the GTA and a non-GTA) that are on the terminal, permission for accessing the GTA.

For example, the CA may use the auxiliary command "CA_SEND_DATA" in Table 1.

2.1: The GTA selects a corresponding applet based on the received transaction data from the CA.

It should be noted that the GTA stores some general logic, for example, how to select, based on information sent by the CA, an applet corresponding to the CA. For example, the GTA stores a list of CAs that may access the GTA, and a list of applets that may be accessed by these CAs. In this way, after receiving the transaction data from the CA, the GTA may determine, based on the lists, whether the CA may access the GTA and an applet that may be accessed by the CA. The applet that may be accessed by the CA is the selected applet.

2.2: The GTA sends a GTA capability list to the selected applet.

Specifically, the GTA capability list is used to notify the applet of a capability, of the GTA, of executing a specific reverse command, for example, a mass storage capability, a capability of displaying a QR code, a capability of sending data, and a trusted user interface capability.

It should be noted that this step is an optional step. For example, if the GTA sends the GTA capability list during a previous transaction, or the terminal agrees on a GTA capability in advance, this step may not be performed.

For example, the GTA may use the auxiliary command "GTA_SEND_ABILITY" in Table 2.

2.3: The GTA sends the transaction data to the applet.

For example, the GTA may use the auxiliary command "GTA_SEND_DATA" in Table 2.

3.1: The applet sends the reverse command to the GTA.

3.2: The GTA executes the reverse command.

3.3: The GTA sends a response for the reverse command to the applet.

For interaction processes of 3.1, 3.2, and 3.3, refer to the communication mechanism in FIG. 4. Details are not described herein again.

The following separately describes an existing service process and a service process in the embodiments of this application with reference to a specific secure key application. Details are as follows.

Figure 6:
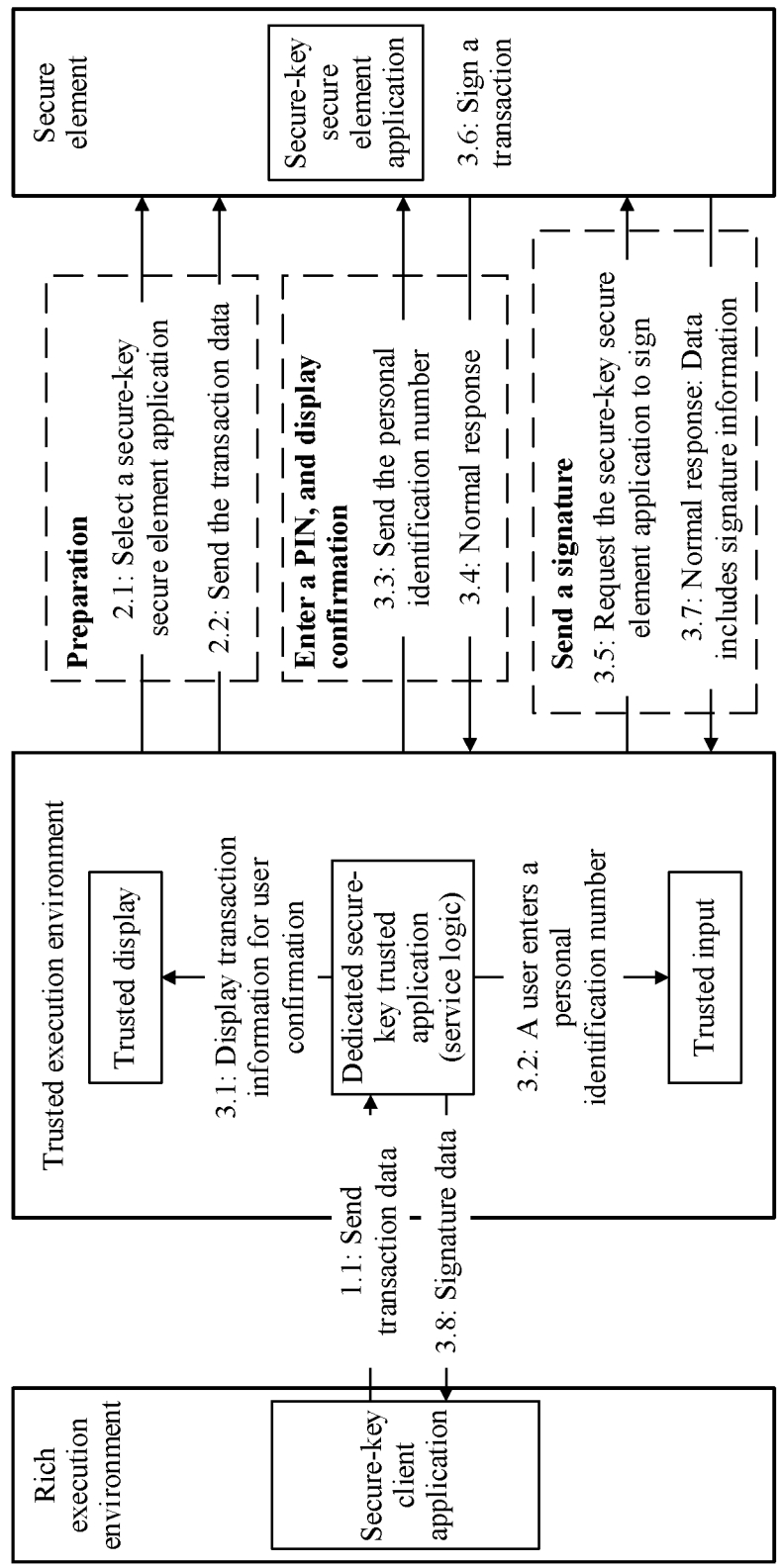
FIG. 6 is a schematic flowchart of a method for running an application in the prior art.

FIG. 6 is a schematic diagram of a service process of an existing secure key application. The following steps are specifically included.

A secure-key CA in an REE receives an operation performed by a user, selects a secure-key TA that corresponds to the secure-key CA and that is in a TEE, and sends transaction data to the selected TA.

After receiving the transaction data sent by the secure-key CA, the secure-key TA selects a secure-key applet corresponding to the secure-key TA, and sends the transaction data to the secure-key applet.

The secure-key TA performs a response service process based on service logic. For example, the secure-key TA may display transaction information by using a TUI, and receive confirmation information entered by the user. The secure-key TA may further receive, by using the TUI, a PIN entered by the user. Then, the secure-key TA sends the PIN entered by the user to the secure-key applet. The applet performs authentication, and sends a response to the secure-key TA. The secure-key TA may further request the secure-key applet to sign the transaction data. After signing the transaction data, the applet sends signing information to the secure-key TA by using a response. Finally, the secure-key TA forwards the signing information to the secure-key CA.

Figure 7:
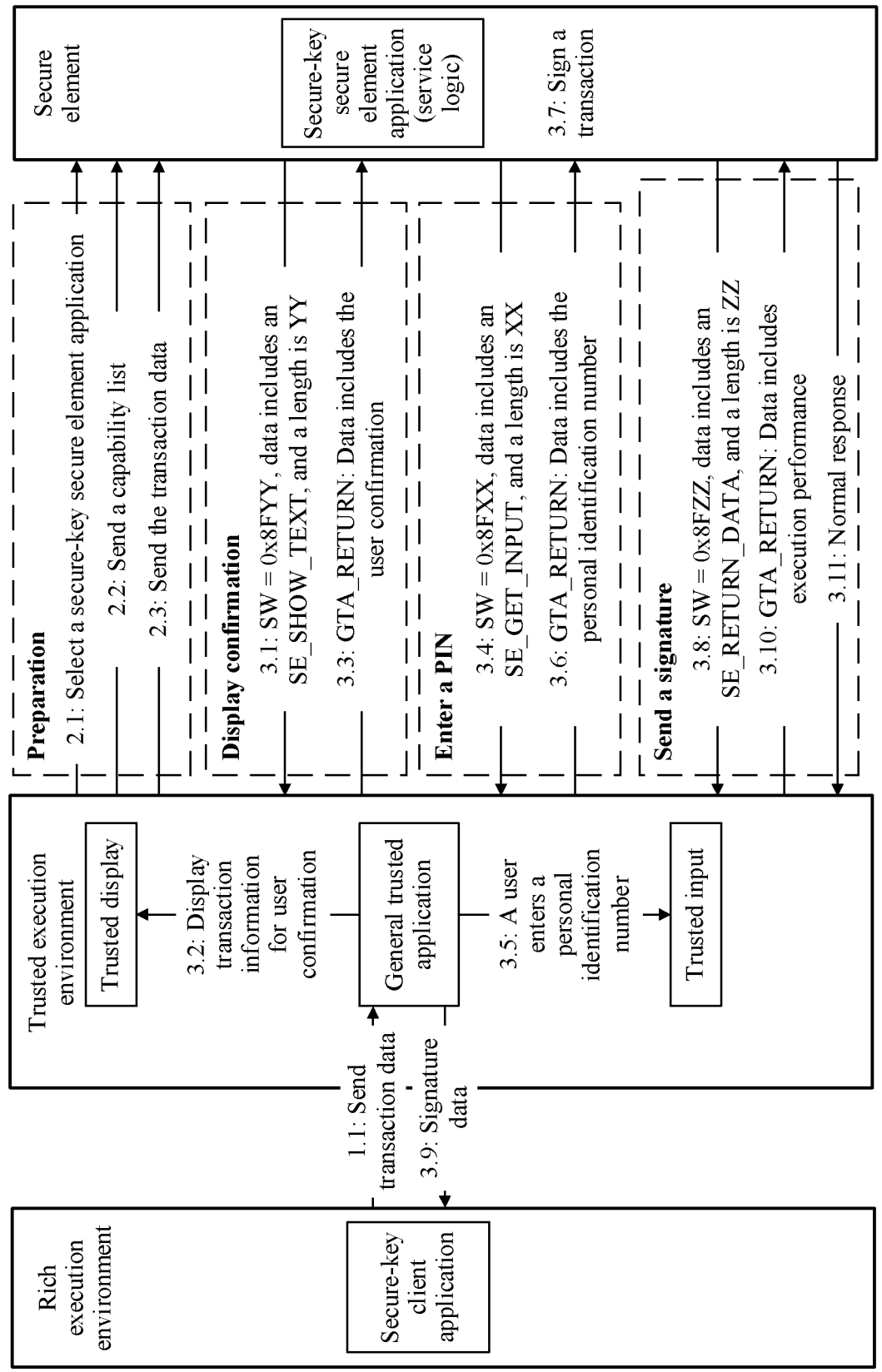
FIG. 7 is a schematic flowchart 3 of a method for running an application according to an embodiment of this application.

FIG. 7 is a schematic diagram of a service process of a secure key application according to an embodiment of this application. The following steps are specifically included.

A secure-key CA in an REE receives an operation performed by a user, selects a GTA in a TEE, and sends transaction data to the GTA.

After receiving the transaction data sent by the CA, the GTA may select, based on a correspondence that is between a CA and an applet and that is stored in the GTA, a secure-key applet corresponding to the CA. For details, refer to the description of step 2.1 in FIG. 5.

Optionally, the GTA sends a GTA capability list to the applet, so that the applet determines a subsequent transaction process based on the GTA capability list. For example, for user identity authentication, it is assumed that service logic of the applet is to preferably select fingerprint verification. If the GTA supports the fingerprint verification, the applet first performs the fingerprint verification. If the GTA does not support the fingerprint verification, the applet selects PIN authentication instead of the fingerprint verification.

The GTA sends the transaction data to the secure-key applet.

Based on the received transaction data and the service logic, the applet sends a reverse command to the GTA by using a special response. The GTA invokes a corresponding resource in the TEE to execute the reverse command, and returns a response to the applet by using an auxiliary command.

For example, the applet sends the reverse command, for example, an SE_SHOW_TEXT, to request to display transaction information to the user. The GTA invokes a TUI to display the transaction information to the user. Then, information confirmed by the user is returned to the applet by using the auxiliary command, for example, a GTA_RETURN.

For example, the applet sends the reverse command, for example, an SE_GET_INPUT, to require the user to enter a PIN. The GTA invokes the TUI to receive the PIN entered by the user, and then returns the PIN to the applet by using the auxiliary command, for example, the GTA_RETURN. The applet authenticates the PIN.

For example, after signing the transaction data, the applet sends a reverse command SE_RETURN_DATA, sends a transaction signature to the secure-key CA by using the GTA, and then returns an execution result to the applet by using the auxiliary command, for example, the GTA_RETURN.

Figure 8:
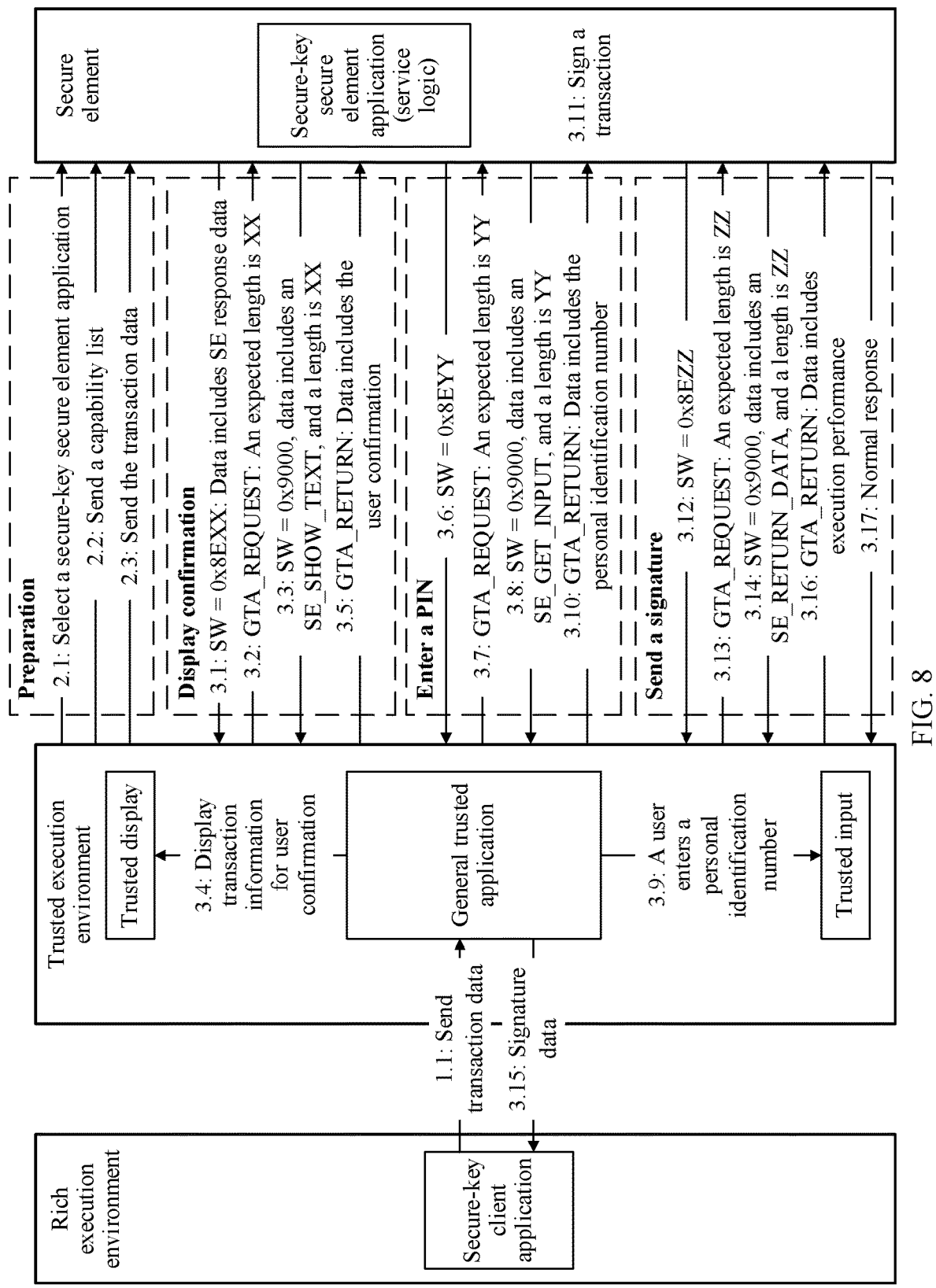
FIG. 8 is a schematic flowchart 4 of a method for running an application according to an embodiment of this application.

FIG. 8 is a schematic diagram of a service process of another secure key application according to an embodiment of this application. It can be learned that the service process shown in FIG. 8 is similar to the service process shown in FIG. 7, but an implementation of carrying a reverse command by using a special command is slightly different. In FIG. 8, an applet uses a special response "0x8EXX" to notify a GTA that the applet needs to send a reverse command. The GTA sends an auxiliary command, for example, a "GTA_REQUEST" to the applet to request the applet to send the reverse command. The applet adds a specific reverse command into response content of a normal response. However, in FIG. 7, the applet directly adds the reverse command in response content of a special response "0x8EXX". For a specific difference, refer to the description of the communication mechanism of the GTA and that of the applet in FIG. 5. Details are not described herein again.

It is considered that there may be a case during use of a secure key service: the GTA or the applet needs to download some resources from a background of an SP. The resources include data required in a transaction such as an image, a text, a certificate, and a file. For example, some SPs need to display their logos (logo) by using the GTA during the transaction. In this case, the logos need to be downloaded from the background of the SP to the GTA or the applet.

Currently, a target resource may be stored in the applet in an SE in a personalization manner in a Global Platform specification. Because a capacity of the applet is limited, a target resource with a small amount of data may be downloaded to the applet in the personalization manner. However, if this manner is used for a target resource with a relatively large amount of data, transaction efficiency is reduced.

Figure 9:
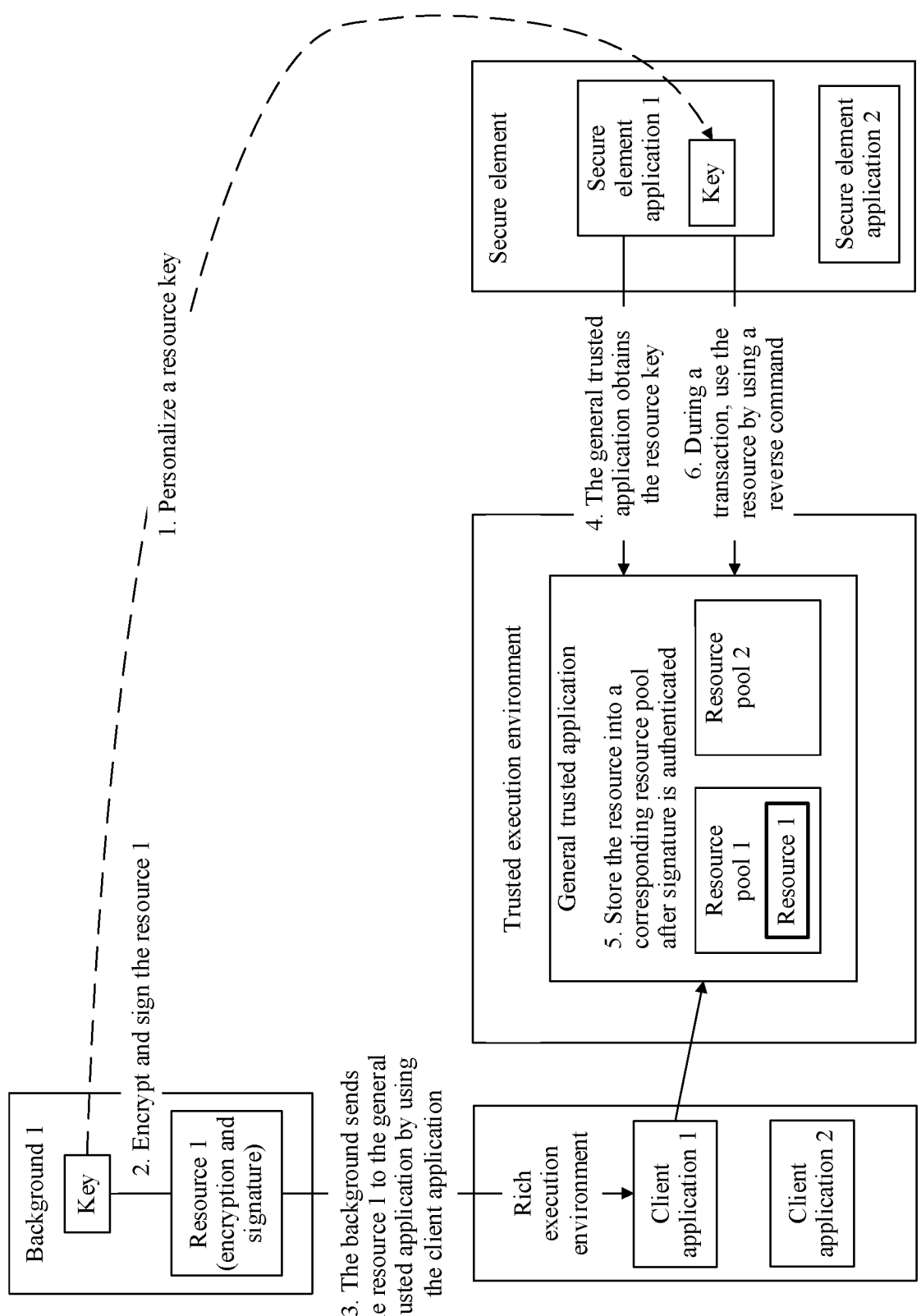
FIG. 9 is a schematic flowchart 5 of a method for running an application according to an embodiment of this application.

Therefore, as shown in FIG. 9, an embodiment of this application further provides a method for downloading a resource by a GTA. The method specifically includes the following steps.

To improve security of downloading a target resource by a terminal, the target resource is encrypted in a background of an SP. A key used for encryption may be stored in an applet on the terminal in a personalization manner. The background sends an encrypted target resource to a GTA by using a CA. The CA may send the encrypted target resource to the GTA by using an auxiliary command such as a CA_MANAGE_RESOURCE. The GTA obtains, from the applet, the key used for the target resource. Then, the GTA performs signature authentication on the encrypted target resource, to determine validity of the target resource. If the signature authentication succeeds, the target resource is stored in the GTA. If the GTA needs to use the target resource, the GTA may directly use the target resource. If the applet needs to use the target resource, the applet may obtain the target resource from the GTA by using a reverse command.

For operations such as replacement and deletion of the target resource, refer to the method. Details are not described herein again.

It may be understood that, to implement the foregoing functions, the terminal, or the like includes corresponding hardware structures and/or software modules for performing the functions. A person skilled in the art should easily be aware that, in combination with the example units, algorithms, and steps described in the embodiments disclosed in this specification, the embodiments of this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the embodiments of the present invention.

In the embodiments of this application, the terminal, or the like may be divided into function modules based on the foregoing method examples. For example, function modules corresponding to various functions are obtained through division, or two or more functions may be integrated into one processing module. The integrated module may be implemented in a form of hardware, or may be implemented in a form of a software function module. It should be noted that, in the embodiments of the present invention, division into modules is an example, is merely logical function division, and may be other division in an actual implementation.

Figure 10:
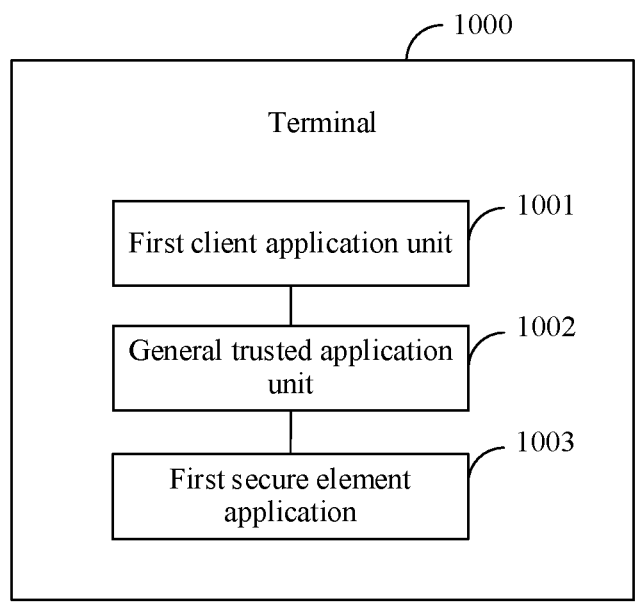
FIG. 10 is a schematic structural diagram 3 of a terminal according to an embodiment of this application.

When the function modules corresponding to various functions are obtained through division, FIG. 10 shows a schematic diagram of a possible structure of the terminal in the foregoing embodiments. As shown in FIG. 10, a terminal 1000 includes a first client application unit 1001, a general trusted application unit 1002, and a first secure element application unit 1003.

The first client application unit 1001 is configured to send a first request to the general trusted application unit 1002, and receive a first response returned by the general trusted application unit 1002, and/or is used in another process of the technology described in this specification.

The general trusted application unit 1002 is configured to: receive the first request from the first client application unit 1001; determine, based on the first request, the first secure element application unit 1003 corresponding to the first client application unit 1001; send the first request to the first secure element application unit 1003; execute the first command; return a first execution result to the first secure element application unit 1003; and send the first response to the first client application unit 1001, and/or is used in another process of the technology described in this specification.

The first secure element application 1003 is configured to send the first command to the general trusted application unit 1002 based on the first request, and is further configured to send the first response to the general trusted application unit 1002 based on the first execution result, and/or is used in another process of the technology described in this specification.

All related content of the steps in the foregoing method embodiment may be cited in function descriptions of corresponding function modules. Details are not described herein again.

Certainly, the terminal 1000 may further include a communications unit, configured to perform interaction between the terminal and another device. The terminal 1000 may further include a storage unit, configured to store program code and data of the terminal. In addition, functions that can be specifically implemented by the functional units include but are not limited to functions corresponding to the method steps in the foregoing embodiment. For detailed descriptions of other units of the terminal 1000, refer to detailed descriptions of the method steps corresponding to the units. Details are not described herein again.

When an integrated unit is used, the first client application unit 1001, the general trusted application unit 1002, and the first secure element application unit 1003 may be integrated as a whole, and may be a processing module of the terminal. The communications unit may be a communications module of the terminal, such as an RF circuit, a Wi-Fi module, or a Bluetooth module. The storage unit may be a storage module of the terminal.

Figure 11:
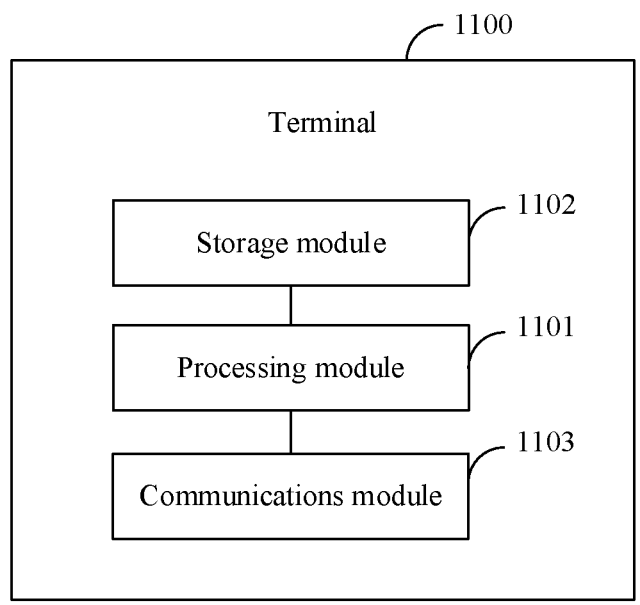
FIG. 11 is a schematic structural diagram 4 of a terminal according to an embodiment of this application.

FIG. 11 shows a schematic diagram of a possible structure of the terminal in the foregoing embodiments. The terminal 1100 includes a processing module 1101, a storage module 1102, and a communications module 1103. The processing module 1101 is configured to perform control management on an action of the terminal. The storage module 1102 is configured to store program code and data of the terminal. The communications module 1103 is configured to communicate with another terminal. The processing module 1101 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The processing module 1101 may implement or execute various example logical blocks, modules, and circuits described with reference to content disclosed in the present invention. The processor may alternatively be a combination that implements a computing function, for example, a combination of one or more microprocessors, or a combination of a DSP and a microprocessor. The communications module 1303 may be a transceiver, a transceiver circuit, a communications interface, or the like. The storage module 1102 may be a memory.

When the processing module 1101 is a processor (for example, the processor 101 shown in FIG. 2), when the communications module 1103 is an RF transceiver circuit (for example, the radio frequency circuit 102 shown in FIG. 2), and when the storage module 1102 is a memory (for example, the memory 103 shown in FIG. 2), the terminal provided in this embodiment of this application may be the terminal 100 in FIG. 2. The communications module 1103 may include an RF circuit, a Wi-Fi module, and a Bluetooth module. Communications modules such as the RF circuit, the Wi-Fi module, and the Bluetooth module may be collectively referred to as a communications interface. The processor, the communications interface, and the memory may be coupled together by using a bus.

The foregoing description about implementations allows a person skilled in the art to understand that, for ease and brevity of description, division of the foregoing function modules is used as an example for description. In an actual application, the foregoing functions may be allocated to different modules and implemented based on a requirement. In other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located at one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for running an application on a terminal comprising:
    receiving, by a general trusted application in a trusted execution environment (TEE) of the terminal, a first request from a first client application, wherein the terminal comprises a rich execution environment (REE), the TEE, and a secure element (SE), wherein a security application on the terminal uses a client application that corresponds to the security application and that is in the REE, wherein an SE application corresponding to the security application is in the SE, and wherein the general trusted application is shared by a plurality of security applications;

determining, by the general trusted application based on the first request, a first secure element (SE) application corresponding to the first client application;

sending, by the general trusted application, the first request to the first SE application;

sending, by the first SE application, a first command to the general trusted application based on the first request;

executing, by the general trusted application, the first command to obtain a first execution result;

returning, by the general trusted application, the first execution result to the first SE application;

sending, by the first SE application, a first response to the general trusted application based on the first execution result;

sending, by the general trusted application, the first response to the first client application;

sending, by the first SE application, a second response to the general trusted application based on the first request, wherein the second response indicates that the first SE application needs to send the first command;

sending, by the general trusted application, a second request to the first SE application based on the second response, wherein the second request requests the first SE application to send the first command; and sending, by the first SE application, a third response to the general trusted application based on the second request, wherein the third response carries the first command.

2. The method of claim 1, further comprising sending, by the first SE application, a fourth response to the general trusted application based on the first request, wherein the fourth response carries the first command.

3. The method of claim 1, further comprising determining, by the general trusted application, the first SE application based on an identifier of the first client application that is carried in the first request and a locally stored correspondence between the identifier of the first client application and an identifier of the first SE application.

4. The method of claim 1, wherein before sending the first request to the first SE application, the method further comprises sending, by the general trusted application, a capability list to the first SE application, and wherein the capability list comprises a plurality of commands to be executed by the general trusted application.

5. The method of claim 4, further comprising sending, by the first SE application, the first command to the general trusted application based on the first request and the capability list.

6. A terminal comprising:
a memory;
an application environment comprising:
a rich execution environment (REE);
a trusted execution environment (TEE); and
a secure element (SE);
a first SE application in the SE;
a first client application in the REE and configured to send a first request; and
a general trusted application in the TEE and is shared by a plurality of security applications and configured to:
receive the first request from the first client application;
determine, based on the first request, the first SE application corresponding to the first client application; and
send the first request to the first SE application,
wherein the first SE application is configured to send a first command to the general trusted application based on the first request,
wherein the general trusted application is further configured to:
execute the first command to obtain a first execution result; and
return the first execution result to the first SE application,
wherein the first SE application is further configured to send a first response to the general trusted application based on the first execution result,
wherein the general trusted application is further configured to send the first response to the first client application, and
wherein the first SE application is further configured to:
send a second response to the general trusted application based on the first request, wherein the second response indicates that the first SE application needs to send the first command;
receive a second request from the general trusted application based on the second response, wherein the second request requests the first SE application to send the first command; and
send a third response to the general trusted application based on the second request, wherein the third response carries the first command.

7. The terminal of claim 6, wherein the first SE application is further configured to send a fourth response to the general trusted application based on the first request, and wherein the fourth response carries the first command.

8. The terminal of claim 6, wherein the general trusted application is further configured to determine the first SE application based on an identifier of the first client application that is carried in the first request and a locally stored correspondence between the identifier of the first client application and an identifier of the first SE application.

9. The terminal of claim 6, wherein the general trusted application is further configured to send a capability list to the first SE application before the general trusted application sends the first request to the first SE application, and wherein the capability list comprises a plurality of commands to be executed by the general trusted application.

10. The terminal of claim 9, wherein the first SE application is further configured to send the first command to the general trusted application based on the first request and the capability list.

11. The terminal of claim 6, wherein the terminal is a phone.

12. A terminal comprising:
a memory configured to store a computer program code; and
a processor coupled to the memory, wherein the computer program code causes the processor to be configured to:
receive, for a general trusted application of the terminal, a first request from a first client application, wherein the terminal comprises a rich execution environment (REE), a trusted execution environment (TEE), and a secure element (SE), wherein the first client application is in the REE, wherein the general trusted application is in the TEE, and wherein the general trusted application is shared by a plurality of security applications;

determine, using the general trusted application based on the first request, a first SE application corresponding to the first client application, wherein the first SE application is in the SE;

send, using the general trusted application, the first request to the first SE application;

send, using the first SE application, a first command to the general trusted application based on the first request;

execute, using the general trusted application, the first command to obtain a first execution result;

return, using the general trusted application, the first execution result to the first SE application;

send, using the first SE application, a first response to the general trusted application based on the first execution result;

send, using the general trusted application, the first response to the first client application;

send, using the first SE application, a second response to the general trusted application based on the first request, wherein the second response indicates that the first SE application needs to send the first command;

send, using the general trusted application, a second request to the first SE application based on the second response, wherein the second request requests the first SE application to send the first command; and send, using the first SE application, a third response to the general trusted application based on the second request, wherein the third response carries the first command.

13. The terminal of claim 12, wherein the computer program code further causes the processor to be configured to send, using the first SE application, a fourth response to the general trusted application based on the first request, and wherein the fourth response carries the first command.

14. The terminal of claim 12, wherein the computer program code further causes the processor to be configured to determine, using the general trusted application, the first SE application based on an identifier of the first client application that is carried in the first request and a locally stored correspondence between the identifier of the first client application and an identifier of the first SE application.

15. The terminal of claim 12, wherein before sending the first request to the first SE application, the computer program code further causes the processor to be configured to send, using the general trusted application, a capability list to the first SE application, and wherein the capability list comprises a plurality of commands to be executed by the general trusted application.

16. The terminal of claim 15, wherein the computer program code further causes the processor to be configured to send, using the first SE application, the first command to the general trusted application based on the first request and the capability list.

17. A computer program product comprising computer-executable instructions stored on a non-transitory computer storage medium that, when executed by a processor, cause a terminal to:

receive, from a first client application, a first request for a general trusted application of the terminal, wherein the terminal comprises a rich execution environment (REE), a trusted execution environment (TEE), and a secure element (SE), wherein the first client application is in the REE, wherein the general trusted application is in the TEE, and wherein the general trusted application is shared by a plurality of security applications;

determine, using the general trusted application based on the first request, a first SE application corresponding to the first client application, wherein the first SE application is in the SE;

send, using the general trusted application, the first request to the first SE application;

send, using the first SE application, a first command to the general trusted application based on the first request;

execute, using the general trusted application, the first command to obtain a first execution result;

return, using the general trusted application, the first execution result to the first SE application;

send, using the first SE application, a first response to the general trusted application based on the first execution result;

send, using the general trusted application, the first response to the first client application;

send, using the first SE application, a second response to the general trusted application based on the first request, wherein the second response indicates that the first SE application needs to send the first command;

send, using the general trusted application, a second request to the first SE application based on the second response, wherein the second request requests the first SE application to send the first command; and send, using the first SE application, a third response to the general trusted application based on the second request, wherein the third response carries the first command.

18. The computer program product of claim 17, wherein the computer-executable instructions that, when executed by the processor, further cause the terminal to send, using the first SE application, a fourth response to the general trusted application based on the first request, and wherein the fourth response carries the first command.

19. The computer program product of claim 17, wherein the computer-executable instructions that, when executed by the processor, further cause the terminal to send, using the general trusted application, a capability list to the first SE application.

20. The computer program product of claim 19, wherein the capability list comprises a plurality of commands to be executed by the general trusted application.

* * * * *